(12) United States Patent
Haselden

(10) Patent No.: US 8,214,799 B2
(45) Date of Patent: Jul. 3, 2012

(54) PROVIDING INFORMATION TO AN ISOLATED HOSTED OBJECT VIA SYSTEM-CREATED VARIABLE OBJECTS

(75) Inventor: J. Kirk Haselden, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1641 days.

(21) Appl. No.: 10/886,835

(22) Filed: Jul. 8, 2004

(65) Prior Publication Data
US 2006/0010419 A1    Jan. 12, 2006

(51) Int. Cl.
*G06F 9/44* (2006.01)
(52) U.S. Cl. ........................... 717/120; 717/104
(58) Field of Classification Search .................. 717/120, 717/102
See application file for complete search history.

(56) References Cited

U.S. PATENT DOCUMENTS

| | | | |
|---|---|---|---|
| 5,548,769 A | | 8/1996 | Baum et al. |
| 5,732,270 A | | 3/1998 | Foody et al. |
| 6,393,386 B1 | | 5/2002 | Zager et al. |
| 6,442,620 B1 | * | 8/2002 | Thatte et al. ................ 719/316 |
| 6,463,470 B1 | | 10/2002 | Mohaban et al. |
| 6,684,220 B1 | * | 1/2004 | Pfeiffer et al. ........... 707/103 R |
| 6,725,280 B1 | * | 4/2004 | Bracha ......................... 719/315 |
| 6,823,520 B1 | * | 11/2004 | Susser et al. ................. 719/315 |
| 6,842,896 B1 | * | 1/2005 | Redding et al. .............. 717/172 |
| 6,907,608 B1 | * | 6/2005 | Susser et al. ................. 719/315 |
| 6,915,301 B2 | * | 7/2005 | Hirsch ......................... 707/102 |
| 6,925,638 B1 | * | 8/2005 | Koved et al. ................. 717/155 |
| 6,968,538 B2 | * | 11/2005 | Rust et al. .................... 717/108 |
| 7,069,554 B1 | * | 6/2006 | Stammers et al. ........... 717/178 |
| 7,089,242 B1 | * | 8/2006 | Chan et al. ...................... 707/9 |
| 7,103,600 B2 | * | 9/2006 | Mullins ......................... 707/10 |
| 7,149,752 B2 | * | 12/2006 | Mangan .................... 707/103 R |
| 7,181,490 B1 | | 2/2007 | Harvey et al. |
| 7,266,827 B1 | * | 9/2007 | Sievert ......................... 719/330 |
| 7,340,717 B2 | * | 3/2008 | Allen et al. .................. 717/106 |
| 7,478,408 B2 | * | 1/2009 | Sesma .......................... 719/328 |
| 7,536,406 B2 | * | 5/2009 | Haselden et al. ............ 707/102 |
| 2001/0025370 A1 | * | 9/2001 | Maruyama et al. ............ 717/2 |
| 2002/0112058 A1 | * | 8/2002 | Weisman et al. ............ 709/227 |
| 2002/0118220 A1 | * | 8/2002 | Lui et al. ..................... 345/709 |
| 2002/0143816 A1 | | 10/2002 | Geiger et al. |
| 2002/0184610 A1 | | 12/2002 | Chong et al. |
| 2002/0199031 A1 | * | 12/2002 | Rust et al. .................... 709/315 |

(Continued)

OTHER PUBLICATIONS

Tim Pabst, "Creating DTS Packages with SQL Server", Feb. 1, 2002, retrieved from <http://www.devarticles.com/c/a/ASP/Creating-DTS-Packages-With-SQL-Server-2000/>, pp. 1-14.*

(Continued)

*Primary Examiner* — Li Zhen
*Assistant Examiner* — Marina Lee
(74) *Attorney, Agent, or Firm* — Woodcock Washburn LLP

(57) ABSTRACT

A system-created variable object may expose a property of an object model to an internal object that does not have access to the object model directly. The system-created variable object may provide a mechanism for communicating the external state of an object model to an internal member (object) without exposing the object model to the internal object. This feature enables an object model object to be isolated, a concept that can be advantageously exploited.

17 Claims, 4 Drawing Sheets

U.S. PATENT DOCUMENTS

| | | | |
|---|---|---|---|
| 2003/0046266 A1 | 3/2003 | Mullins et al. | |
| 2003/0051229 A1* | 3/2003 | Boyle | 717/116 |
| 2003/0093434 A1 | 5/2003 | Stickler | |
| 2003/0110470 A1* | 6/2003 | Hanson et al. | 717/114 |
| 2003/0131347 A1* | 7/2003 | Allison | 717/165 |
| 2003/0167355 A1* | 9/2003 | Smith et al. | 709/328 |
| 2003/0177282 A1* | 9/2003 | Hejlsberg et al. | 709/328 |
| 2004/0060007 A1 | 3/2004 | Gottlob et al. | |
| 2004/0111672 A1 | 6/2004 | Bowman et al. | |
| 2004/0133659 A1* | 7/2004 | Lacey et al. | 709/219 |
| 2004/0153993 A1* | 8/2004 | Chen et al. | 717/108 |
| 2005/0097073 A1* | 5/2005 | Mair et al. | 707/1 |
| 2005/0193264 A1 | 9/2005 | Khan et al. | |
| 2005/0216922 A1 | 9/2005 | Mogilevsky et al. | |
| 2005/0228728 A1 | 10/2005 | Stromquist | |
| 2005/0235291 A1* | 10/2005 | Kamiya et al. | 719/315 |
| 2005/0273703 A1 | 12/2005 | Doughan | |

OTHER PUBLICATIONS

Larsen et al., "Data Transformation Services (DTS) in Microsoft SQL 2000", Sep. 2000, retrieved from Mircrosoft TechNet, pp. 1-13.*

Timothy Peterson, "A quick Look at DTS in SQL 2000", Jun. 8, 2001, retrieved from <www.developer.com/db/article.php/781121>, pp. 1-7.*

Claude Seidman ,"Data mining with Microsoft SQL server 2000 Technical Reference Press", Microsoft Press,May 2001,ISBN-13:9780735612716,pp. 1-20.*

Bertino, E. et al., "Mandatory Security and Object-Oriented Systems: A Multilevel Entity Model and Its Mapping onto a Single-Level Object Model", *Theory and Practice of Object Systems*, 1998, 4(3), 183-204.

Henney, K. et al., "What's in a Name?", *Application Development Advisor*, 2003, 7(2), 40-43.

Jackson, D. et al., "COM Revisted: Tool-Assisted Modelling of an Architectural Framework", *Software Engineering Notes*, 2000, 25(6), 149-158.

Weber, S.H., "A Connectionist Model of Conceptual Representation", *International Joint Conference on Neural Networks*, 1989, 83(1), 477-483.

In the United States Patent and Trademark Office, Non-Final Office Action in re U.S. Appl. No. 10/887,273, filed Jul. 8, 2004, 39 pages.

* cited by examiner

PROVIDING INFORMATION TO AN ISOLATED HOSTED OBJECT VIA SYSTEM-CREATED VARIABLE OBJECTS

CROSS-REFERENCE

This application is related to U.S. application Ser. No. 10/887,273, filed Jul. 8, 2004, now abandoned.

FIELD OF THE INVENTION

The invention relates to object models and in particular to providing information to isolated hosted objects via system-created variable objects.

BACKGROUND OF THE INVENTION

The concept of data hiding or containment is well-known in computer science. The motivation for data hiding is to reduce dependency between the environment, internal structure and the code that manipulates it. Illegally accessing hidden data usually results in a compile-time or run-time error.

Data hiding is a characteristic of object-oriented programming. Because an object can only be associated with data in predefined classes or templates, the object can only "know" about the data it needs to know about, eliminating the possibility that someone maintaining the code may inadvertently point to or otherwise access the wrong data unintentionally.

It is sometimes desirable, however, to provide some of this hidden data to an isolated object, while maintaining the object's isolation. It would be helpful if there were a way to provide hidden data to an isolated object without destroying the object's isolation.

SUMMARY OF THE INVENTION

A system-created variable object may expose a property of an object model to an internal object that does not have access to the object model directly. The system-created variable object may provide a mechanism for communicating the external state of an object model to an internal member (object) without exposing the object model to the internal object. This feature enables an object model object to be isolated, a concept that can be advantageously exploited.

A portion of an object model such as a package may be associated with one or more variables, which may be implemented as objects. A variable object in a package may be used in a way similar to the way a variable is used in a traditional programming language, that is, a variable object may be created, its value may be changed or updated, the variable may be associated with a particular type (e.g., read-only, temporary, etc.) and so on.

In the object model, an object may be wrapped by a host object that isolates the object from the rest of the object model. Often the hosted object needs access to the properties of other objects in the object model, but because of the benefits of isolation, it is not desirable to permit the object access to the other objects directly.

System variables are variable objects which may be created by the runtime, (the execution environment that handles the execution time behavior of the object model), to expose certain properties of the object model to an isolated hosted object. The collection of system variables is accessible by the hosted object, and may be identified by using a specified naming convention. In this way, the hosted object has access to required or useful system information, yet the hosted object remains isolated.

BRIEF DESCRIPTION OF THE DRAWINGS

The foregoing summary, as well as the following detailed description of illustrative embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Overview

Figure 1:
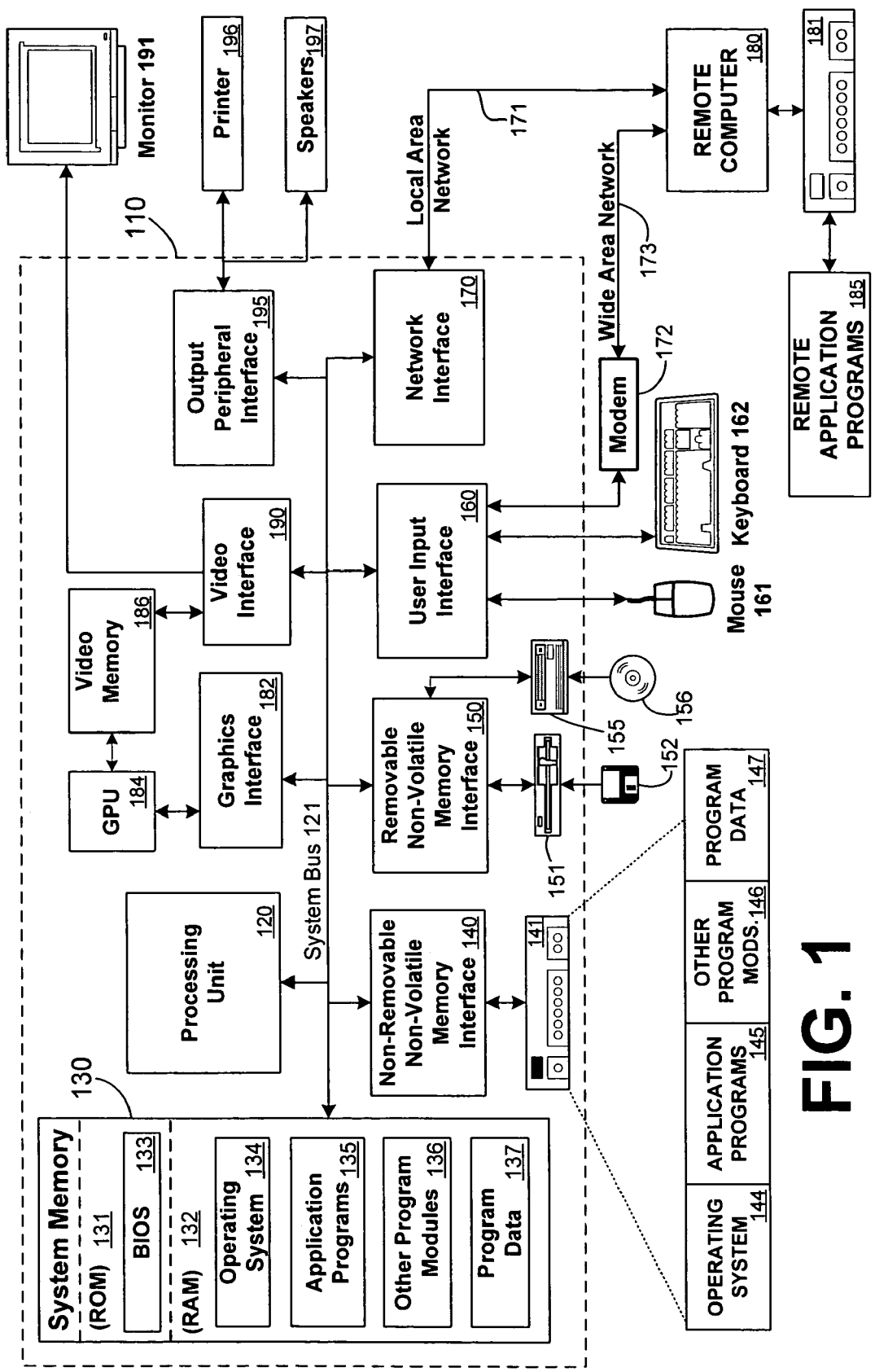
FIG. 1 is a block diagram showing an exemplary computing environment in which aspects of the invention may be implemented.

An object model may be defined as a collection of objects and relationships. Each of the objects may be associated with one or more properties that govern the execution behavior of the object.

In an illustrative implementation, a Data Transformation Service (DTS) provides a set of tools that allows for the extraction, transformation/consolidation and loading of data from one or more sources into one or more destinations supported by DTS connectivity. By using DTS tools to graphically build DTS packages or by programming a package with the DTS object code, custom data movement solutions tailored to the specialized business needs of an organization may be created.

A DTS package is an organized collection of connections, DTS tasks, DTS transformations and workflow constraints assembled either programmatically or with a DTS tool and saved to MICROSOFT® SQL Server™, a structured storage file, an XML file or a Microsoft Visual Basic® file. Generally, each package includes one or more steps that are executed sequentially or in parallel when the package is run. When executed, the package connects to the appropriate data source(s), extracts data from the source(s), (optionally) transforms the data, and loads the transformed data into one or more destinations.

A DTS task is a discrete set of functionality, executed as a step in a DTS package. Each task defines a work item to be performed as part of the data movement and data transformation process, or as a job to be executed. Examples of commonly used DTS tasks include importing and exporting data, transforming data, copying database objects, and sending messages to and receiving messages from other users and packages, and so on. A DTS transformation may include one or more functions or operations applied to a piece of data before the data is loaded into the destination. A DTS transformation may be composed of a number of DTS sub-transformations, connected together into a transformation chain; that is, the output of a first sub-transformation may be input to the next sub-transformation in the chain and so on.

A DTS connection manager establishes valid connections to source and destination data and to any additional data sources (for example, lookup tables). A DTS connection manager enables connections to data stored in a wide variety of OLE DB-compliant formats as well as custom or nonstandard formats. The following varieties of connections, among others, may be enabled:

a data source connection to standard databases including but not limited to Microsoft SQL Server™ 2000, Microsoft Access 2000, Oracle, dBase, Paradox; OLE DB connections to ODBC data sources; Microsoft Excel 2000 spreadsheet data; HTML sources; and other OLE DB providers.

a file connection. When specifying a text file connection, the format of the file may be specified (e.g., whether a text file is in delimited or fixed field format, whether the text file is in a Unicode or an ANSI format, the row delimiter and column delimiter if the text file is in fixed field format, the text qualifier, whether the first row contains column names.

a data link connection, in which an intermediate file outside of SQL Server stores the connection string.

Logging and failure notification options are accessed by setting an output file to which notifications are set. Business rules may be applied to data without writing code for scheduling, logging, notifying of failure or completion, or file downloading.

A DTS package may be associated with one or more variables, which may be implemented as objects. A variable object in a package may be used in a way similar to the way a variable is used in a traditional programming language, that is, a DTS variable object may be created, its value may be changed or updated, the variable may be associated with a particular type (e.g., read-only, temporary, etc.) and so on.

In the DTS object model, an object may be wrapped by a host object that isolates the object from the rest of the object model. Often the hosted object needs access to the properties of other objects in the object model, but because of the benefits of isolation, it is not desirable to permit the object access to the other objects directly.

System variables are variable objects created by the DTS runtime, (the execution environment that handles the execution time behavior of the DTS object model), to expose certain possibly critical properties of the object model to an isolated hosted object. The collection of system variables is accessible by the hosted object, and may be identified by using a specified naming convention. In this way, the hosted object has access to required or useful system information, yet the hosted object remains isolated.

Exemplary Computing Environment

FIG. 1 and the following discussion are intended to provide a brief general description of a suitable computing environment in which the invention may be implemented. It should be understood, however, that handheld, portable, and other computing devices of all kinds are contemplated for use in connection with the present invention. While a general purpose computer is described below, this is but one example, and the present invention requires only a thin client having network server interoperability and interaction. Thus, the present invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer, and/or included within the network browsing software which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers, and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of coprocessing devices may be included in computer 110. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

Providing Information to an Isolated Hosted Object Via System-Created Variables

Figure 2:
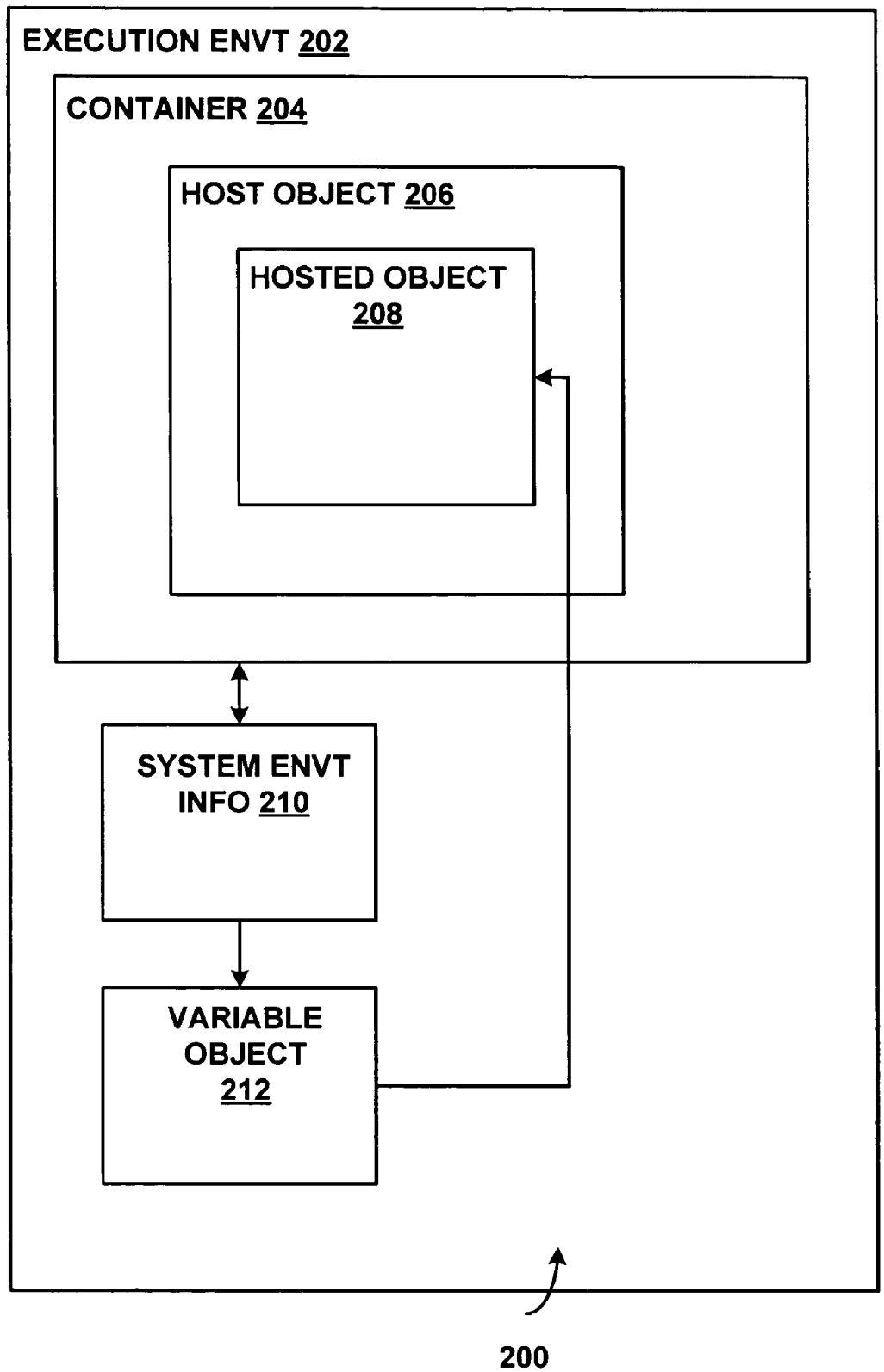
FIG. 2 is a block diagram of an exemplary system for providing information to an isolated hosted object via a system-created variable in accordance with one embodiment of the invention.

FIG. 2 is a block diagram of an exemplary system 200 for providing information to an isolated hosted object via one or more system-created variable objects in accordance with one embodiment of the invention. The system of FIG. 2 may reside on a computer such as computer 110 described above with respect to FIG. 1. Alternatively, system 200 may be distributed across one or more computers.

In FIG. 2, system 200 may comprise one or more of the following: an execution environment 202, one or more containers, as represented by container 204, one or more host objects as represented by host object 206, and one or more hosted objects as represented by hosted object 208. A container such as container 204 may be included within another container, (not shown). Similarly, container 204 may include another container, (not shown). Any number of levels of nesting of containers are possible. A container such as container 204 may be associated with one or more properties or other system environment information points such as counters, enumerators, environment variables, execution parameters and so on as represented by system environment information 210 in FIG. 2. The collection of all the objects of system 200 may be referred to as the object model for system 200. In FIG. 2, the object model includes container 204, host object 206, hosted object 208, system environment information 210, and variable object 212.

An execution environment (e.g., a runtime) may execute container 204. Container 204 may include one or more host objects such as host object 206. A host object may wrap a hosted object and expose properties of the hosted object and other properties and behavior. Host object 206 may host one or more hosted objects such as hosted object 208.

Hosted object 208 in some embodiments of the invention may be an isolated object, that is, hosted object 208 may execute within the environment of host object 206 and be unaware of container 204 or anything external to host object 206. In other words, hosted object 208 may be wrapped by a host (e.g., host object 206) that isolates hosted object 208 from the rest of the object model. In some embodiments of the invention, the hosted object 208 may be extensible. An object type that may be extended, modified, replaced or created by a third party may be considered an extensible object. Exemplary extensible objects include but are not limited to a new object type that "plugs in" to an existing object model and an object type from which a new object type may be derived.

Container 204 may be associated with one or more properties or other information about the environment such as counters, enumerators, environment variables, execution parameters or the like, represented in FIG. 2 by exemplary system environment information 210. System environment information 210 in some embodiments of the invention is directly inaccessible to hosted object 208. In some embodiments of the invention, one or more variable objects, represented in FIG. 2 by exemplary variable object 212 are created to store the value of system environment information 210. Variable object 212 may be directly accessible to hosted object 208.

Figure 3:
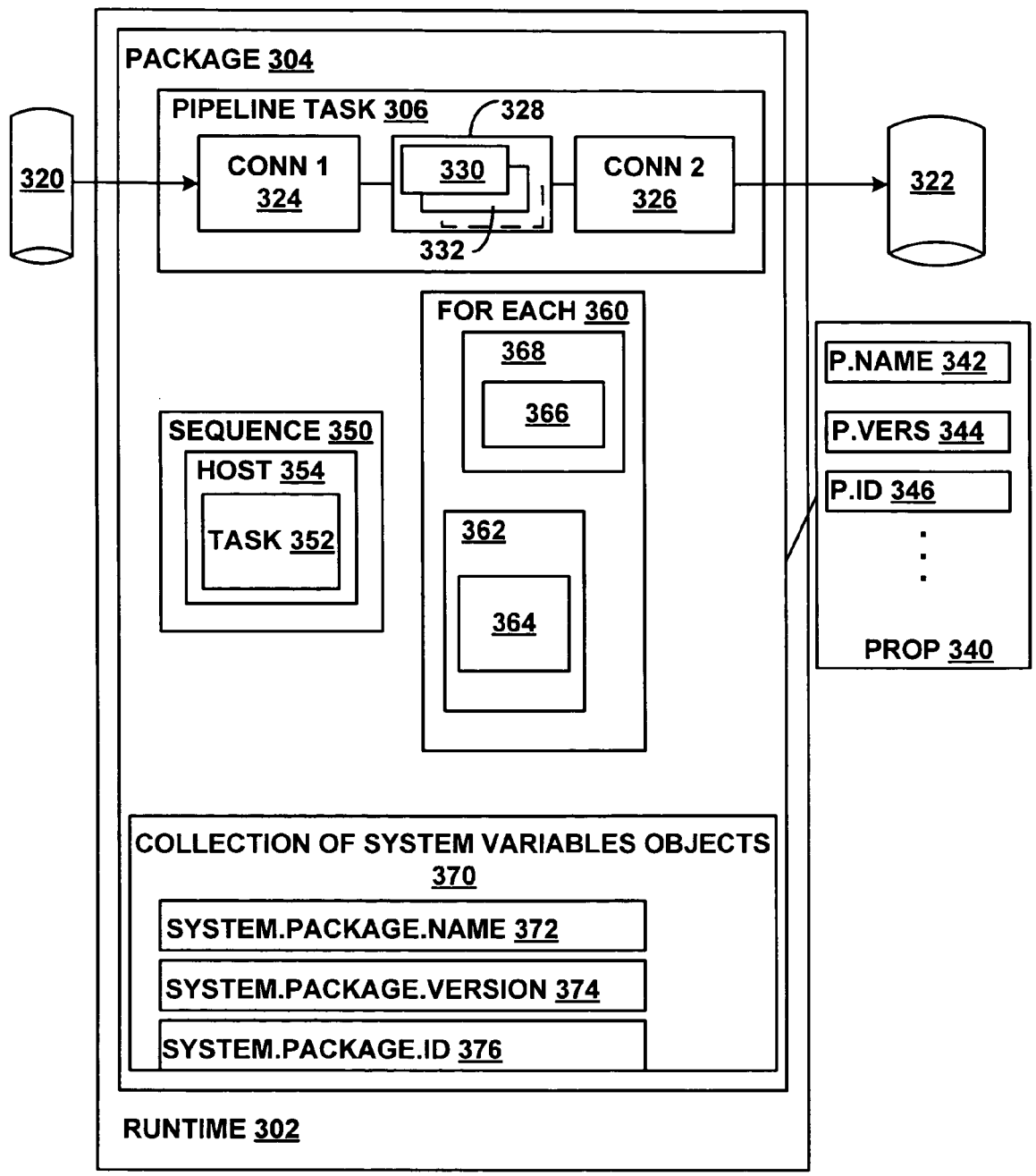
FIG. 3 is a block diagram of an exemplary implementation of the system of FIG. 2 in accordance with one embodiment of the invention.

FIG. 3 illustrates an exemplary implementation of a system for providing information to an isolated hosted object via one or more system-created variable objects. In FIG. 3, package 304 is a DTS package as described above for extracting data from a source 320, optionally transforming the data and loading the data into a destination 322. Package 304 may be executed by execution environment 302. In some embodiments of the invention, execution environment 302 is Microsoft's DTS runtime. Source 320 may comprise a structured file (including but not limited to an HTTP file, an HTML document/file, an XML document/file), an unstructured file (including but not limited to a flat file, or FTP (File Transport Protocol) file), a semi-structured file, or a database (such as but not limited to a SQL database, Oracle database, or the like) from which data is to be extracted. Destination 322 may comprise a structured file (including but not limited to an HTTP file, an HTML document/file, an XML document/file), an unstructured file (including but not limited to a flat file, or FTP (File Transport Protocol) file), a semi-structured file, or a database (such as but not limited to a SQL database, Oracle database or the like) into which data is to be loaded.

A DTS package such as DTS package 304 may be associated with one or more properties (e.g., PackageName, PackageVersion, PackageID, etc.) or other system environment information including counters, enumerators, environment variables, execution parameters or the like. The collection of properties and other system environment information is represented in FIG. 3 as package properties 340, a collection of properties and other system environment information including PackageName 342, PackageVersion 344, PackageID 346, etc. In some embodiments of the invention, runtime 302 creates a collection of variable objects for storing the values for the collection of properties and other system environment information. In FIG. 3, this collection of variable objects is represented as system variables 370, and includes system variable objects System::PackageName 372, System::PackageVersion 374, System::PackageID 376, etc. corresponding respectively to PackageName 342, PackageVersion 344, PackageID 346, etc. That is, for example, System::Package-.Name 372 may be the system-created object corresponding to Package.Name 342 and so on. Runtime 302 may update the collection of system variable objects 370 as the values of the package properties 340 change.

An exemplary DTS package 304 in FIG. 3 may include pipeline task. A pipeline task such as pipeline task 306 may reference connection managers and transformations. Connection managers, as represented by connection managers 324 and 326 in FIG. 2, may in some embodiments, enable connections to be made to a source or destination. For example, connection manager 324 may manage the connection between the DTS package 304 and the source 320 while connection manager 326 may manage the connection between the DTS package 304 and the destination 322.

Data extracted from source 320 may be transformed as determined by transformations, such as transformations 328. Transformations 328 may be composed of one or more steps in a transformation chain, as represented by sub-transformations 330, 332, etc. in FIG. 3.

A DTS package such as DTS package 304 may include one or more hosted objects, representing functionality within the DTS package. DTS hosted objects may be tasks, connection managers, (also called connections), log providers and so on. Hosted objects may be hosted by respective host objects such as ConnectionHost, TaskHost, LogProviderHost and so on.

DTS package 304 may include a number of hosted objects, such as exemplary hosted objects 352, 364 and 366 hosted respectively by host objects 354, 362 and 368 in FIG. 3. These hosted objects may be tasks, connections, log providers and so on. Exemplary host objects may include but are not limited to a task host, a connection host, a log provider host and so on. Exemplary tasks include but are not limited to FTP tasks, SQL tasks, file system tasks and the like. Hosted objects such as tasks, connections, log providers and so on may be included within containers such as a sequence (e.g., sequence 350) or a for each loop (e.g., for each loop 360) or the like. Hosted objects, as discussed above, do not have direct access to properties and other environment information associated with the DTS package (e.g., collection of properties 340). Suppose, for example, that DTS package 304 includes an isolated hosted object (e.g., a task 352). Suppose further that task 352 needs to know the value of the PackageVersion property 344 for package 304. Task 352, because it is an isolated hosted object within host object 354, does not have direct access to property PackageVersion property 344, however, task 352 does have direct access to system variables object collection 370 and may access System.Package.Version property 374 of system variables objects collection 370 to obtain this information.

Figure 4:
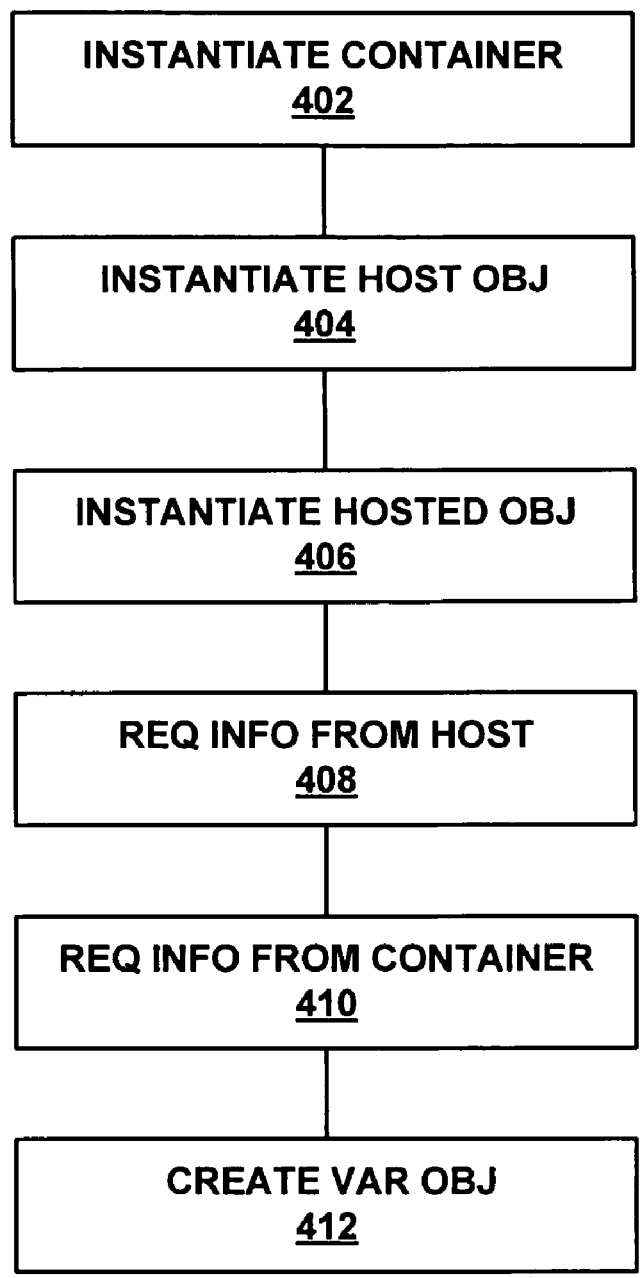
FIG. 4 is a flow diagram of an exemplary method of providing information to an isolated hosted object via a system-created variable in accordance with one embodiment of the invention.

FIG. 4 is a flow diagram for a method of providing information to an isolated hosted object in an object model via a system-created variable object. One or more of the steps in the method may be optional. One or more of the steps in the method may be repeated. In some embodiments of the invention, the steps may occur in any order. At step 402 a container may be instantiated by an execution environment. At step 404 the container may instantiate a host object. At step 406 the host object may instantiate a hosted object. At step 408 the hosted object may require information from the object model and request the required information from the host object. At step 410 the host may ask the container for the required information. At step 412, in response to receiving the request for the required information from the container, the execution environment may place the requested information in an object accessible to the hosted object (e.g., in the collection of objects called system variable objects.) The hosted object may retrieve the required information from the collection of system variable objects. The execution environment may update the system variable objects as the value of the corresponding hosted object-inaccessible information changes.

For example, referring again to FIG. 3, suppose a host object 362 hosts a hosted object 364. Suppose hosted object 364 is a logging task within container 350. Logging task 352 may require the Package.Version property of DTS package 304 in order to place this information on the log. However, logging task 364 may be unable to directly access Package-.Version 344. Logging task 364 may request Package.Version from task host 362 (step 408 in FIG. 4). The task host 362 may request this information from FOR EACH loop 360, (step 410) which may request Package.Version from DTS package 304 (step 410) which may request this information from the runtime 302. Runtime 302 (step 412) may place the value of Package.Version 344 in system-created variable object System.Package.Version 374. Logging task 364 may then access System.Package.Version.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects of the present invention, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

While the present invention has been described in connection with the preferred embodiments of the various figures, it is to be understood that other similar embodiments may be used or modifications and additions may be made to the described embodiments for performing the same function of the present invention without deviating therefrom. Therefore, the present invention should not be limited to any single embodiment, but rather should be construed in breadth and scope in accordance with the appended claims.

What is claimed is:

1. A system for providing information from a property source to an isolated hosted object in an object model, the information in the property source being inaccessible to the isolated hosted object, the system comprising:

a data storage medium in an execution environment comprising a package enclosing a container, the package configured to transform data from a plurality of data sources to a plurality of data destinations, the package associated with a collection of properties and system environment information, the collection of properties and system environment information stored in the property source, the container comprising a host object that comprises the isolated hosted object, the host object configured to wrap the isolated hosted object for execution within the host object and to isolate the isolated hosted object such that the container, the package enclosing the container, and other portions of the object model are not accessible to the isolated hosted object, the isolated hosted object being associated with a functionality of the package; and a processor that has executable instructions for the execution environment creating a variable object therein, transmitting the information from the property source to the isolated hosted object via the variable object in response to a request from the isolated host object, the information comprising information about the collection of properties and system environment information, the variable object being configured for storing a value associated with the information from the property source to be communicated to the isolated hosted object.

2. The system of claim 1, wherein the container further comprises a data transformation service package connection for providing system environmental information to the isolated hosted object via one or more system-created variable objects wherein the system environmental information comprises at least counters, enumerators, environment variables and execution parameters of the container.

3. The system of claim 1, wherein the host object is a task host.

4. The system of claim 1, wherein the isolated hosted object is a task.

5. The system of claim 1, wherein the host object is a connection host.

6. The system of claim 1, wherein the isolated hosted object is a connection.

7. The system of claim 1, wherein the host object is a logging provider host.

8. The system of claim 1, wherein the isolated hosted object is a logging provider.

9. The system of claim 1, wherein the isolated hosted object comprises a task, the task referencing a connection manager.

10. A method for providing information from a property source to an isolated hosted object disposed in a host object that is disposed in a container of an execution environment, the information in the property source being inaccessible to the isolated hosted object, the method comprising:

instantiating the execution environment, the execution environment instantiating a package, the package configured to transform data from a plurality of data sources to a plurality of data destinations, the package associated with a collection of properties and execution environment information, the collection of properties and execution environment information stored in the property source, the package comprising a container, the container instantiating the host object, the host object instantiating at least one isolated hosted object, the host object configured to wrap the isolated hosted object for execution within the host object and to isolate the isolated hosted object such that the container, the package enclosing the container, and portions of an object model comprising the execution environment, the container, the host object, and the isolated hosted object are inaccessible to the isolated hosted object, the isolated hosted object being associated with a functionality of the package;

requesting the information from the property source for the isolated host object, the information in the property source being inaccessible by the isolated hosted object, the information comprising at least the collection of properties associated with the package;

generating, in response to the request, a variable object in the execution environment that is accessible to the isolated host object;

storing by the execution environment values associated with the requested information from the property source in the system variable object; and providing the values to the isolated hosted object via the variable object.

11. The method of claim 10, wherein the execution environment is an application runtime.

12. The method of claim 10, wherein the container is a data transformation service package.

13. The method of claim 10, wherein the isolated hosted object is a task host.

14. The method of claim 10, wherein the isolated hosted object is a task.

15. The method of claim 10, wherein the isolated hosted object comprises a set of functionality in a data transformation service.

16. A computer-readable storage medium comprising computer-executable instructions for instantiating an execution environment, the execution environment instantiating a package, the package configured to transform data from a plurality of data sources to a plurality of data destinations, the package associated with a collection of properties and execution environment information, the collection of properties and execution environment information stored in a property source, the package comprising a container, the container instantiating a host object, the host object instantiating at least one hosted object, the host configured to wrap the isolated hosted object for execution within the host object and to isolate the isolated hosted object such that the container, the package enclosing the container, and portions of an object model comprising the execution environment, the container, the host object, and the isolated hosted object are inaccessible to the isolated hosted object, the isolated hosted object being associated with a functionality of the package;

requesting the information from the property source for the isolated host object, the information in the property source being inaccessible to the isolated hosted object, the information comprising at least the collection of properties associated with the package;

generating, in response to the request, a variable object in the execution environment that is accessible to the isolated host object;

storing by the execution environment values associated with the requested information from the property source in the system variable object; and providing the values to the isolated hosted object via the variable object.

17. The computer-readable storage medium of claim 16, comprising further computer-executable instructions for updating the variable object in response to a change in the information not directly accessible to the hosted object.

* * * * *